(12) United States Patent
Daimer

(10) Patent No.: US 7,736,413 B2
(45) Date of Patent: Jun. 15, 2010

(54) METHOD FOR USING FRACTURE RESISTANT ELECTRODES IN A CARBOTHERMIC REDUCTION FURNACE

(75) Inventor: Johann Daimer, Mörfelden-Walldorf (DE)

(73) Assignee: SGL Carbon SE, Wiesbaden (DE)

( * ) Notice: Subject to any disclaimer, the term of this patent is extended or adjusted under 35 U.S.C. 154(b) by 0 days.

(21) Appl. No.: 12/233,216

(22) Filed: Sep. 18, 2008

(65) Prior Publication Data

US 2009/0007723 A1    Jan. 8, 2009

Related U.S. Application Data

(63) Continuation of application No. 11/123,775, filed on May 5, 2005, now abandoned.

(60) Provisional application No. 60/571,755, filed on May 17, 2004.

(51) Int. Cl.
*C22B 4/08* (2006.01)
*C25B 11/12* (2006.01)

(52) U.S. Cl. .................. 75/10.27; 204/280

(58) Field of Classification Search .............. 75/674, 75/10.27; 204/280
See application file for complete search history.

(56) References Cited

U.S. PATENT DOCUMENTS

| | | | |
|---|---|---|---|
| 2,974,032 A | 3/1961 | Grunert et al. | |
| 3,607,221 A | 9/1971 | Kibby et al. | |
| 4,099,959 A | 7/1978 | Dewing et al. | |
| 4,486,229 A | 12/1984 | Troup et al. | |
| 4,491,472 A | 1/1985 | Stevenson et al. | |
| 4,998,709 A * | 3/1991 | Griffin et al. | 264/29.5 |
| 5,431,812 A * | 7/1995 | Abraham | 208/131 |
| 6,440,193 B1 * | 8/2002 | Johansen et al. | 75/10.27 |
| 6,830,595 B2 | 12/2004 | Reynolds, III | |
| 7,008,526 B2 | 3/2006 | Kanno et al. | |
| 2005/0249260 A1 | 11/2005 | Smith | |

OTHER PUBLICATIONS

Marshall J. Bruno: "Aluminum Carbothermic Technology Comparison to Hall-Heroult Process", Light Metals 2003, Pennsylvania, USA, pp. 395-400.

* cited by examiner

*Primary Examiner*—George Wyszomierski
*Assistant Examiner*—Tima M McGuthry-Banks
(74) *Attorney, Agent, or Firm*—Laurence A. Greenberg; Werner H. Stemer; Ralph E. Locher

(57) ABSTRACT

Graphite electrodes for the production of aluminum by carbothermic reduction of alumina are either submerged in the molten bath in the low temperature compartment or they are horizontally arranged in the side walls of the high temperature compartment. The electrodes are manufactured by using a mixture of coke particles covering the complete particle size range between 25 µm to 3 mm and by using an intensive mixer to effectively wet all coke particles with pitch. The electrodes have a flexural strength of at least 20 $N/mm^2$. By using a complete range (continuum) of particle sizes in conjunction with an intensive mixer, the geometric packing of the particles is significantly improved, hence the material density is increased and thus a higher mechanical strength as well as improved electrical conductivity in comparison to conventional graphite electrodes is achieved.

16 Claims, No Drawings

US 7,736,413 B2

METHOD FOR USING FRACTURE RESISTANT ELECTRODES IN A CARBOTHERMIC REDUCTION FURNACE

CROSS-REFERENCE TO RELATED APPLICATION

This application is a continuation of, and claims priority from, U.S. patent application Ser. No. 11/123,775, filed on May 5, 2005, now abandoned, which claims priority from U.S. Provisional Application No. 60/571,755, filed May 17, 2004.

BACKGROUND OF THE INVENTION

1. Field of the Invention

The present invention relates to graphite electrodes for the production of aluminum by carbothermic reduction of alumina.

2. Description of the Related Art

For a century the aluminum industry has relied on the Hall-Heroult process for aluminum smelting. In comparison with processes used to produce competing materials, such as steel and plastics, the process is energy-intensive and costly. Hence, alternative aluminum production processes have been sought.

One such alternative is the process referred to as direct carbothermic reduction of alumina. As described in U.S. Pat. No. 2,974,032 (Grunert et al.) the process, which can be summarized with the overall reaction $$Al_2O_3 + 3C = 2Al + 3CO \qquad (1)$$

takes place, or can be made to take place, in two steps:

$$2Al_2O_3 + 9C = Al_4C_3 + 6CO \qquad (2)$$

$$Al_4C_3 + Al_2O_3 = 6Al + 3CO \qquad (3).$$

Reaction (2) takes place at temperatures between 1900 and 2000° C. The actual aluminum producing reaction (3) takes place at temperatures of 2200° C. and above; the reaction rate increases with increasing temperature. In addition to the species stated in reactions (2) and (3), volatile Al species including $Al_2O$ are formed in reactions (2) and (3) and are carried away with the off gas. Unless recovered, these volatile species represent a loss in the yield of aluminum. Both reactions (2) and (3) are endothermic.

Various attempts have been made to develop efficient production technology for the direct carbothermic reduction of alumina (cf. Marshall Bruno, Light Metals 2003, TMS (The Minerals, Metals & Materials Society) 2003). U.S. Pat. No. 3,607,221 (Kibby) describes a process in which all products quickly vaporize to essentially only gaseous aluminum and CO, containing the vaporous mixture with a layer of liquid aluminum at a temperature sufficiently low that the vapor pressure of the liquid aluminum is less than the partial pressure of the aluminum vapor in contact with it and sufficiently high to prevent the reaction of carbon monoxide and aluminum and recovering the substantially pure aluminum.

Other patents relating to carbothermic reduction to produce aluminum include U.S. Pat. Nos. 4,486,229 (Troup et al.) and 4,491,472 (Stevenson et al.). Dual reaction zones are described in U.S. Pat. No. 4,099,959 (Dewing et al.). More recent efforts by Alcoa and Elkem led to a novel two-compartment reactor design as described in U.S. Pat. No. 6,440,193 (Johansen et al.).

In the two-compartment reactor, reaction (2) is substantially confined to a low-temperature compartment. The molten bath of $Al_4C_3$ and $Al_2O_3$ flows under an underflow partition wall into a high-temperature compartment, where reaction (3) takes place. The thus generated aluminum forms a layer on the top of a molten slag layer and is tapped from the high-temperature compartment. The off-gases from the low-temperature compartment and from the high-temperature compartment, which contain Al vapor and volatile $Al_2O$ are reacted in a separate vapor recovery units to form $Al_4C_3$, which is re-injected into the low-temperature compartment. The energy necessary to maintain the temperature in the low-temperature compartment can be provided by way of high intensity resistance heating such as through graphite electrodes submerged into the molten bath. Similarly, the energy necessary to maintain the temperature in the high-temperature compartment can be provided by a plurality of pairs of electrodes substantially horizontally arranged in the sidewalls of that compartment of the reaction vessel.

In the manufacturing of graphite products, large grinding, milling and sieving operations ensure that the required combination of compatible grain sizes of coke are formed into a blend which is then being mixed with binder pitch. In general, one blends a fraction of relatively large coke particles with another fraction of smaller coke particle to optimally fill out the gap between the large particles. The technical as well as economical requirements to establish and run such grinding, milling and sieving equipment are quite substantial, yet they are not in any case offset by the high quality properties of the finished graphite products.

In the context of the production of aluminum by carbothermic reduction, the requirements to the mechanical strength of the graphite electrodes submerged into the molten bath in the low temperature compartment and even more so to the electrodes horizontally arranged in the side walls of the high temperature compartment are challenging because the relatively long electrodes have to sustain the partially extensive movements of the molten bath which furthermore contains solid particles of carbon and slag a well as gas bubbles, all contributing to a mechanically demanding environment. To manufacture graphite electrodes that provide enough mechanical strength for this application requires careful selection of raw materials, especially of coke, and sophisticated particle sieving and blending efforts.

SUMMARY OF THE INVENTION

It is accordingly an object of the invention to provide a fracture-resistant electrode for a carbothermic reduction furnace, in which alumina is reduced to metallic aluminum, which overcomes the above-mentioned disadvantages of the heretofore-known devices and methods of this general type and which has the required mechanical strength and which is manufactured without any sieving or blending operational steps.

With the foregoing and other objects in view there is provided, in accordance with the invention, a graphite electrode for a carbothermic reduction furnace. The graphite electrode is formed of coke particles having a substantially continuous particle size distribution of from 25 μm to 3 mm, in a matrix of completely carbonized coal-tar pitch binder, and graphitized to form a graphite electrode body.

In accordance with an added feature of the invention, the coke particles are anode grade particles with an iron content of less than 0.1% by weight, and the electrode body is graphitized at a final graphitization temperature of below 2700° C. Preferably, the electrode body has an iron content of approximately 0.05% by weight.

In accordance with an additional feature of the invention, an amount of carbon nanofibers or carbon fibers is incorporated in the electrode body for increasing a mechanical strength and adjusting a coefficient of thermal expansion thereof.

With the above and other objects in view there is also provided, in accordance with the invention, an intermediate product in the production of a graphite electrode, comprising: particles of coke having a particle size with a substantially Gaussian distribution in a range from 25 μm and 3 mm mixed with a pitch binder and formed into a green electrode to be baked and graphitized to form a graphite electrode. Preferably, the pitch binder is present at approximately 15% by weight of the green electrode.

With the above and other objects in view there is also provided, in accordance with the invention, a method of producing a graphite electrode, which comprises:

milling coke particles to a continuous distribution of particle sizes from substantially 25 μm to substantially 3 mm, and mixing the coke particles with a coal-tar pitch binder to form a mixture;

forming an electrode body from the mixture to form a green electrode;

baking the green electrode at a temperature of between approximately 700° C. and approximately 1100° C., to carbonize the pitch binder to solid coke, to form a carbonized electrode;

graphitizing the carbonized electrode with a heat treatment for a time sufficient to cause carbon atoms in the carbonized electrode to organize into a crystalline structure of graphite; and machining the graphitized electrode into a final electrode shape.

In accordance with another feature of the invention, a batch of coke particles is screened into a coarse-grain fraction and a fine-grain fraction, separately milling the coarse-grain fraction and the fine-grain fraction, and subsequently joining the milled fractions to a coke particle batch having a Gaussian distribution of particles sizes.

In accordance with a further feature of the invention, the coarse-grain fraction is milled into particles having a particle distribution of from 200 μm to 3 mm and the fine-grain fraction is milled into particles having a particle distribution of from 25 μm to 300 μm.

In a preferred embodiment of the invention, the coke is provided in the form of anode grade coke, and the electrode is graphitized at a graphitizing temperature of up to 2700° C., and preferably at between 2200° C. to 2500° C.

In another embodiment of the invention, the coke is provided in the form of needle coke, and the electrode is graphitized at a graphitizing temperature of between 2700° C. and 3200° C.

In accordance with again an added feature of the invention, after the baking step, the electrode is impregnated at least one time with coal tar or petroleum pitch for depositing additional pitch coke in open pores of the electrode, and each impregnating step is followed with an additional baking step.

In accordance with an added feature of the invention, oils or other lubricants are added into the mixture and the green electrode is formed by extrusion. Alternatively, the green electrode is formed by molding in a forming mold or by vibromolding in an agitated mold.

In accordance with again an additional feature of the invention, a relatively low proportion of carbon fibers and/or carbon nanofibers is mixed into the mixture for forming the green electrode.

In accordance with a concomitant feature of the invention, a graphite electrode column is produced by fabricating a plurality of graphitized electrodes with the above-outlined method, producing a nipple configured to mesh with the graphitized electrodes, and connecting the electrodes and the nipple to form a graphite electrode column.

In other words, the present invention provides for graphite electrodes for the production of aluminum by carbothermic reduction of alumina, more particularly to the graphite electrodes submerged into the molten bath in the low temperature compartment as well as to the electrodes horizontally arranged in the side walls of the high temperature compartment. The electrodes of this invention are manufactured by using a mixture of coke particles covering the complete particle size range between 25 μm to 3 mm and by using an intensive mixer to effectively wet all coke particles with pitch and said electrodes having a flexural strength of at least 20 N/mm$^2$.

By using a complete range (continuum) of particle sizes in conjunction with an intensive mixer, the geometric packing of the particles is significantly improved, hence the material density is increased and thus a higher mechanical strength as well as improved electrical conductivity in comparison to conventional graphite electrodes is achieved.

Other features which are considered as characteristic for the invention are set forth in the appended claims.

Although the invention is illustrated and described herein as embodied in a graphite electrode for a carbothermic reduction furnace, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of an exemplary implementation of the invention, including specific examples and embodiments of the invention.

DETAILED DESCRIPTION OF AN EMBODIMENT OF THE INVENTION

The following examples are presented to further illustrate and explain the present invention. They should not be viewed as limiting in any regard. Unless otherwise indicated, all parts and percentages are by weight.

Example

According to this invention, the as-shipped anode or needle coke particles are initially screened into two fractions, with a coarse-grain fraction containing particles larger than 5 mm. The coarse grain fraction is then online-fed into a mill having stronger milling-paddles and yielding grains of 200 μm to 3 mm. In parallel, a fine-grain fraction is fed into a mill designed for finer grains and providing particles of 25 μm to 300 μm size. The two fractions are then joined once more and the resulting powder contains coke particles with a Gaussian particle size distribution between 25 μm and 3 mm.

The power is pre-heated to 100-125° C. in a rotating-drum heating unit and then mixed at 150 to 160° C. in an intensive mixer, such as an Eirich mixer (Maschinenfabrik Gustav Eirich GmbH & Co KG, Hardheim, Germany), together with 15% (w/w) binder pitch.

In one further embodiment, up to 5% (w/w) graphite dust from machining of graphite electrodes and green scrap from other operations may be added to the intensive mixer as well.

Other ingredients that may be incorporated into the blend at low levels include carbon nanofibers or carbon fibers to provide additional mechanical strength or to adjust the CTE (coefficient of thermal expansion) of the final electrode as well as oils or other lubricants to facilitate extrusion of the blend.

The resulting so-called green mixture is then forwarded to a press or extrusion unit where the so-called green electrodes are shaped to their final format.

The green electrode is then baked at a temperature of between approx. 700° C. and approx. 1100° C., more preferably between about 800° C. and about 1000° C., to carbonize the pitch binder to solid coke, to give the electrode permanency of form, high mechanical strength, good thermal conductivity, and comparatively low electrical resistance. The baking step is carried out in the relative absence of air at a heating rate of about 1 K to about 5 K per hour to the final temperature. After baking, the electrode may be impregnated one or more times with coal tar or petroleum pitch, or other types of pitches known in the industry, to deposit additional pitch coke in any open pores of the electrode. Each impregnation is then followed by an additional baking step.

After baking, the electrode—referred to at this stage as a carbonized electrode—is then graphitized by heat treatment for a time sufficient to cause the carbon atoms in the calcined coke and pitch coke binder to transform from a poorly ordered state into the crystalline structure of graphite. If anode coke is used as the starting material, the graphitization is carried out at a final temperature between 2100° C. to 2700° C., more preferably between 2200° C. to 2500° C. Because of the purity of the anode coke, the comparably low graphitization temperatures are sufficient to reach the required final electrode ash contents. If needle coke is used as the raw material, graphitization is performed at a temperature of between about 2700° C. and about 3200° C. At these high-temperatures, all elements other than carbon are volatilized and escape as vapors. The time required for maintenance at the graphitization temperature is no more than about 12 hours, preferably about 30 min to about 3 hours. Graphitization can be performed in Acheson furnaces or in lengthwise graphitization (LWG) furnaces, the latter can also be operated in a continuous mode. After graphitization is completed, the finished electrode can be cut to size and then machined or otherwise formed into its final configuration.

Comparative Example

A comparative conventional graphite electrode was manufactured by using needle coke with particles up to about 25 millimeters (mm) in average diameter. The crushed, sized and milled coke was mixed with 15% (w/w) coal-tar pitch in a Z-arm kneader. The resulting green mixture was subsequently processed into an graphite electrode as described above.

The present invention offers numerous advantages over the art. It provides electrodes with required mechanical strength without the need for any sieving or blending operational steps. Due to the shortened manufacturing sequence, the quality of the final graphite electrode can be kept at a very defined level with fewer rejections and the same production line can have more throughput than conventional lines.

| Electrode type | | $GE_{anode\ coke}$ | $GE_{needle\ coke}$ | $GE_{conventional}$ |
|---|---|---|---|---|
| Bulk Density | (g/cm$^3$) | 1.76 | 1.78 | 1.73 |
| Open Porosity | (%) | 22 | 14 | 17 |
| Specific electrical resistivity | (µOhm m) | 10 | 4 | 6 |
| Flexural strength | (N/mm$^2$) | 20 | 26 | 14 |
| Iron content | (%) | 0.07 | 0.25 | 0.2 |

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

I claim:

1. A method for producing a metal, comprising the steps of:
   providing a raw ingredient to a carbothermic reduction furnace including a shaped graphite electrode body formed of anode grade coke particles with an iron content of less than 0.1% by weight and having a particle size with a substantially Gaussian distribution in a range from 25 µm to 3 mm in a matrix of carbonized coal-tar pitch binder, and graphitized at a final graphitization temperature of below 2,700° C. to form a graphite electrode body, the shaped graphite electrode body being formed without any sieving or blending operational steps; and
   reducing the raw ingredient to the desired metal using the carbothermic reduction furnace.

2. The method of claim 1, wherein the electrode body has an iron content of approximately 0.05% by weight.

3. The method of claim 1, wherein the electrode body further comprises an amount of carbon nanofibers incorporated in the electrode body for increasing a mechanical strength and adjusting a coefficient of thermal expansion thereof.

4. The method of claim 1, wherein the electrode body further comprises an amount of carbon fibers incorporated in the electrode body for increasing a mechanical strength and adjusting a coefficient of thermal expansion thereof.

5. The method of claim 1, wherein the raw ingredient is alumina.

6. A method for producing a metallic metal, comprising the steps of:
   providing a raw ingredient to a carbothermic reduction furnace including a shaped graphite electrode body formed from an intermediate product including particles of anode grade coke having a particle size with a substantially Gaussian distribution in a range from 25 µm and 3 mm mixed with a pitch binder and formed into a green electrode to be baked and graphitized to form a graphite electrode, the shaped graphite electrode body being formed without any sieving or blending operational steps; and
   reducing the raw ingredient to the desired metallic metal using the carbothermic reduction furnace.

7. The method of claim 6, wherein the pitch binder is approximately 15 by weight of the green electrode.

8. A method for producing a metal, comprising the steps of:
providing a raw ingredient to a carbothermic reduction furnace including a graphite electrode body produced by:
- milling anode grade coke particles having a Gaussian distribution of particle sizes from substantially 25 µm to substantially 3 mm, and mixing the coke particles with a coal-tar pitch binder to form a mixture;
- forming an electrode body from the mixture to form a green electrode, the electrode body being formed without any sieving or blending operational steps;
- baking the green electrode at a temperature of between approximately 700° C. and approximately 1100° C., to carbonize the pitch binder to solid coke, to form a carbonized electrode;
- graphitizing the carbonized electrode at a graphitizing temperature of up to 2,700° C. with a heat treatment for a time sufficient to cause carbon atoms in the carbonized electrode to organize into a crystalline structure of graphite; and
- machining the graphitized electrode into a final electrode shape; and reducing the raw ingredient to the desired metallic metal using the carbothermic reduction furnace.

9. The method according to claim 8, wherein the milling step comprises screening a batch of coke particles into a coarse-grain fraction and a fine-grain fraction, separately milling the coarse-grain fraction and the fine-grain fraction, and subsequently joining the milled fractions to a coke particle batch having a Gaussian distribution of particles sizes.

10. The method according to claim 9, which comprises milling the coarse-grain fraction into particles having a particle distribution of from 200 µm to 3 mm and milling the fine-grain fraction into particles having a particle distribution of from 25 µm to 300 µm.

11. The method according to claim 8, which comprises graphitizing at a temperature of between 2200° C. to 2500° C.

12. The method of claim 8, which further comprises the step of:
after the baking step, impregnating the electrode at least one time with coal tar or petroleum pitch for depositing additional pitch coke in open pores of the electrode, and following each impregnating step with an additional baking step.

13. The method of claim 8, further including the step of adding oils or other lubricants into the mixture and forming the green electrode by extrusion.

14. The method of claim 8, further comprising the step of forming the green electrode by molding in a forming mold or by vibromolding in an agitated mold.

15. The method of claim 8, further comprising the step of adding a relatively low proportion of carbon fibers or carbon nanofibers into the mixture for forming the green electrode.

16. The method of claim 8, wherein the carbothermic reduction furnace includes a graphite electrode column, and the graphite electrode body is one of a plurality of graphitized electrodes included in the graphite electrode column, each of the graphitized electrodes being produced in the same way as the graphite electrode body, the graphite electrode column further including a nipple configured to mesh with each of the plurality of graphitized electrodes to form the graphite electrode column.

* * * * *